Dec. 13, 1955     F. J. PFEIFLE     2,726,718
APPARATUS FOR CUTTING BLANKS FROM SHEET MATERIAL
Filed Dec. 12, 1951     3 Sheets-Sheet 1
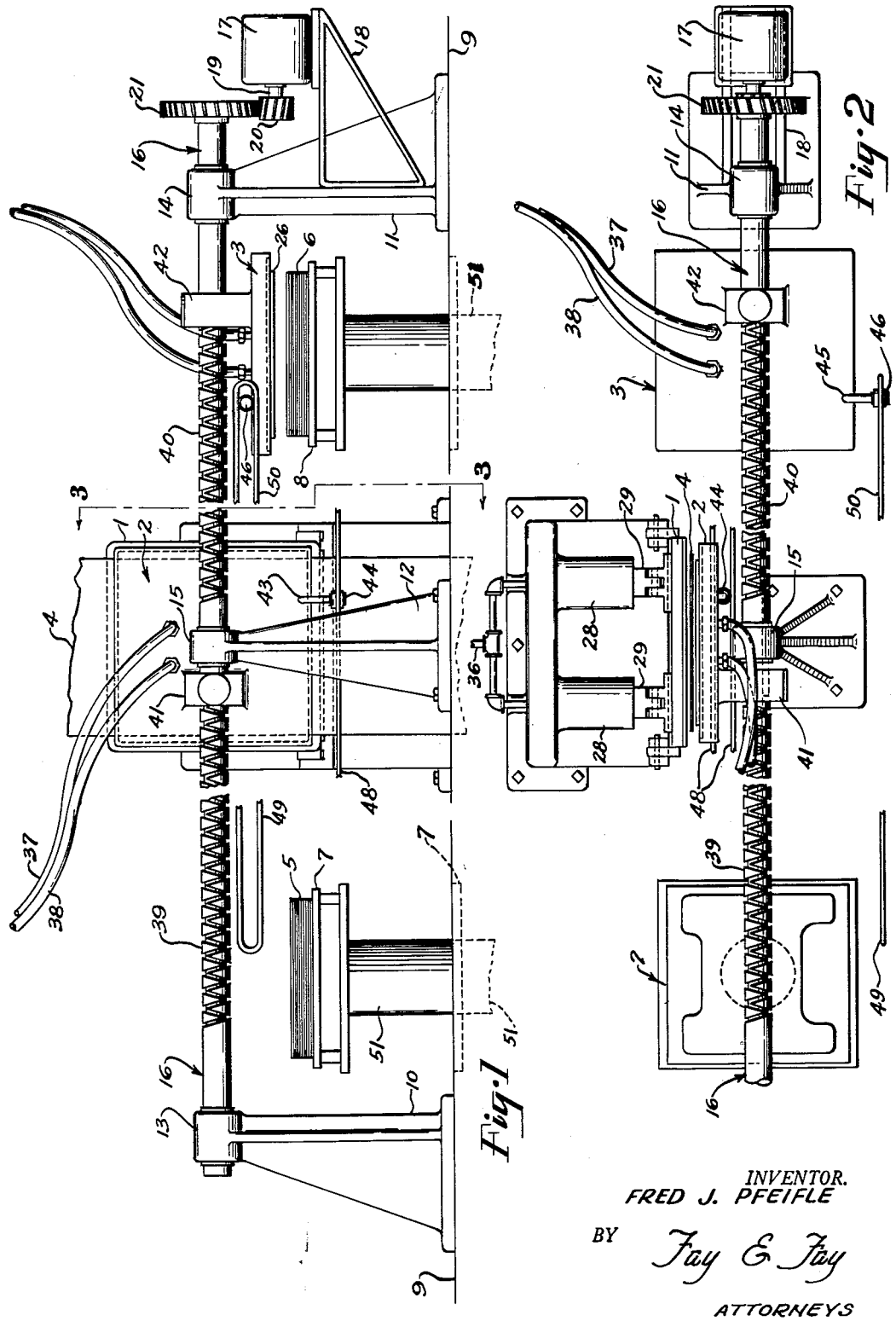
INVENTOR.
FRED J. PFEIFLE
BY
Fay & Fay
ATTORNEYS Dec. 13, 1955  F. J. PFEIFLE  2,726,718
APPARATUS FOR CUTTING BLANKS FROM SHEET MATERIAL
Filed Dec. 12, 1951  3 Sheets-Sheet 2

INVENTOR.
FRED J. PFEIFLE
BY
Fay & Fay
ATTORNEYS

Dec. 13, 1955 F. J. PFEIFLE 2,726,718
APPARATUS FOR CUTTING BLANKS FROM SHEET MATERIAL
Filed Dec. 12, 1951 3 Sheets—Sheet 3
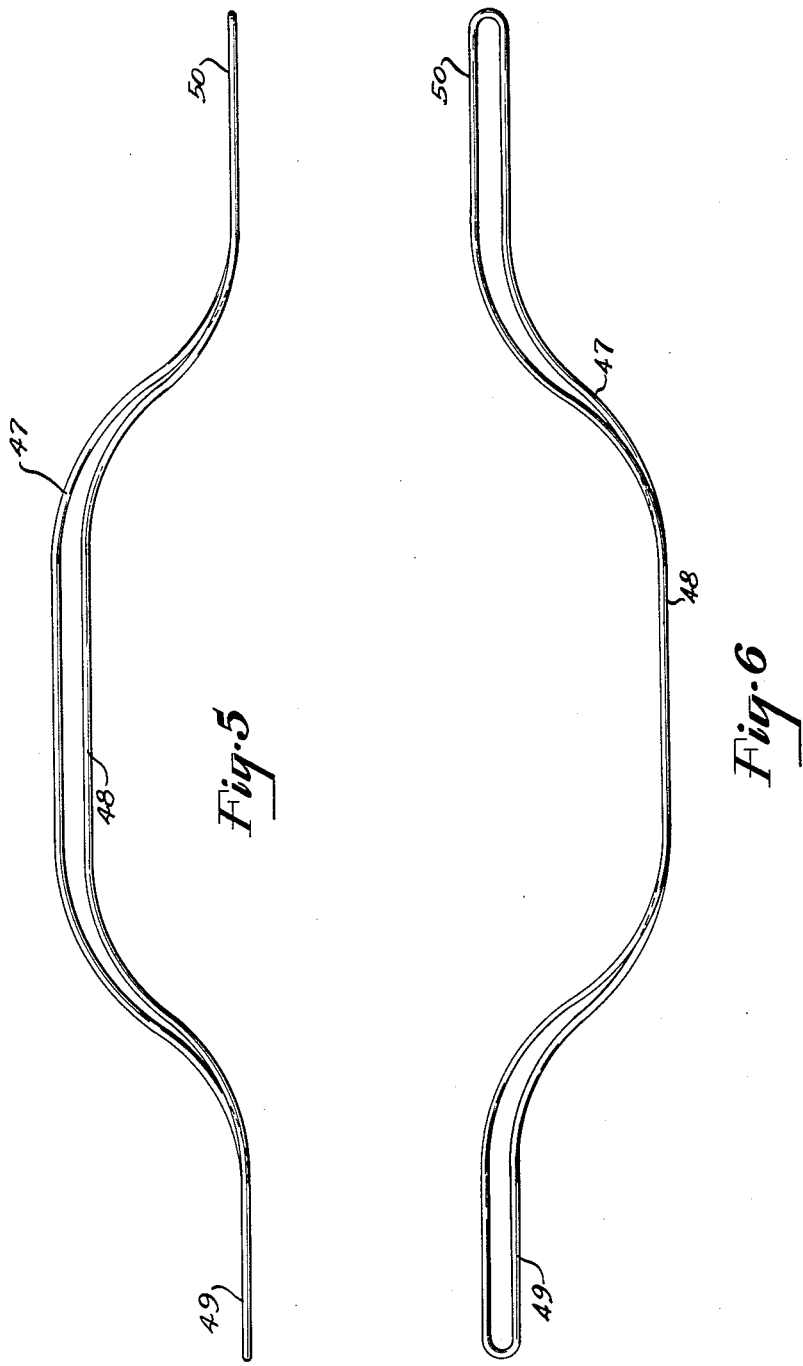
INVENTOR.
FRED J. PFEIFLE
BY
*Fay & Fay*
ATTORNEYS

United States Patent Office 2,726,718
Patented Dec. 13, 1955

2,726,718
APPARATUS FOR CUTTING BLANKS FROM SHEET MATERIAL

Fred J. Pfeifle, Willoughby, Ohio

Application December 12, 1951, Serial No. 261,283

12 Claims. (Cl. 164—19)

This invention relates in general to cutting apparatus and more particularly to power operated apparatus for cutting blanks out of roll fed continuous sheets and for piling the blanks as they are cut.

Conventional apparatus for blanking out uncured sheet stock, for example, employs an endless conveyor belt for feeding the sheet material horizontally to a position under the cutting apparatus, such as a clicker punch press which has a blade head that is operated downwardly to cut the blanks as they rest on the conveyor belt. This arrangement is highly unsatisfactory from several viewpoints. In the first place, if adequate pressure is applied behind the blade head, there is great danger of also cutting the conveyor belt. If less pressure is applied, the result is a less than complete cutting out of the blank, leaving further manual handling to obtain a complete blank completely severed from the sheet of the material. Other objections include the necessity for manual handling and disposal of the waste material and also the manual labor involved in removal of the blanks from the conveyor belt and the stacking of the blanks for storage and shipment.

It is therefore, one of the primary objects of the invention to overcome these and other disadvantages present in conventional blank cutting apparatus by providing power roll mechanism, without any conveyor belt, for feeding the sheet of material vertically into position between a vertically disposed, power operated die cutting head and a vertically disposed power operated rigid backing plate, whereby a full and complete blank cut may be obtained.

Another object is to provide automatic power driven means whereby the die cutting unit is adapted to move the vertical cutting position to carry the blanks and lay them horizontally in a stack and then return to its vertical position for other cutting operations.

With the foregoing and other objects in view, the invention resides in the combination of parts and in the details of construction hereinafter set forth in the following specification and appended claims, certain embodiments thereof being illustrated in the accompanying drawing, in which—

Fig. 1 is a view in side elevation of one form the invention may take, employing a power operated platen, a pair of die plate cutting heads, a common motor operated timing screw and a pawl carried by each die plate to move its die plate linearly back and forth for a predetermined distance and a trackway and rollers for guiding and tilting each die plate alternately into vertical blank cutting position and into horizontal blank stacking position;

Fig. 2 is a top plan view of the device shown in Fig. 1;

Fig. 5 is a top plan view of the roller engaging trackway for guiding the two die cutting heads alternately towards its center for positioning the die cutter in horizontal blank stacking position; and Fig. 6 is a view in front elevation of the track shown in Fig. 5.

Figure 3:
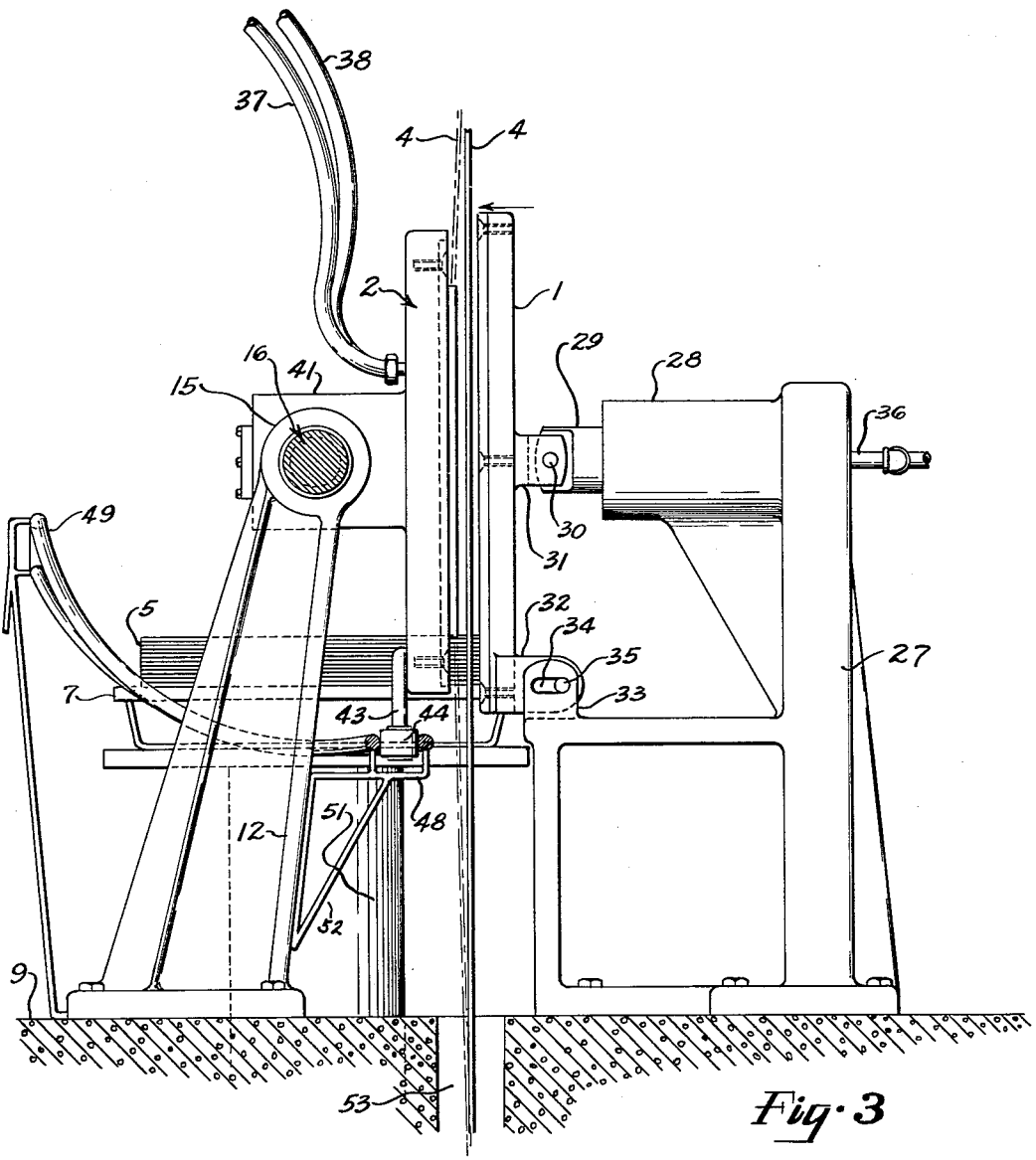
Fig. 3 is a view in section taken along line 3—3 of Fig. 1 showing the platen and die cutting head and roll of sheet stock in readiness for the vertical cutting operation.
Figure 4:
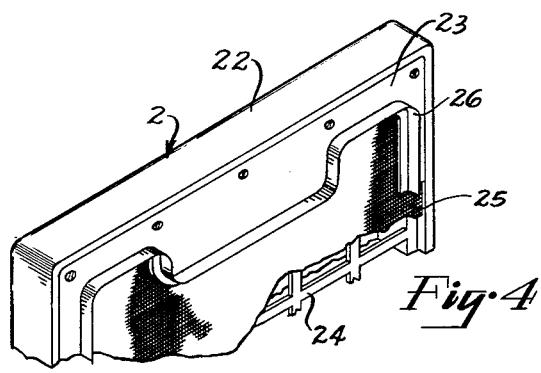
Fig. 4 is a fragmentary view in perspective of the die cutting plate, partly broken away to show the reinforcing ribs.

Referring more particularly to the drawings, I have shown one embodiment of my invention to include a single platen 1 and a pair of die plate cutter heads 2 and 3 for alternately cutting blanks out of a sheet of material 4 and piling them in horizontal stacks 5 and 6 on platforms, or pellets, 7 and 8, respectively.

In order to support and operate such an apparatus for such desired purpose, I may secure to a suitable base 9 a pair of vertical end supports 10 and 11 and an intermediate vertical support 12 having, respectively, suitable journals 13, 14 and 15 for supporting a rotary shaft, generally indicated at 16. A suitable electric motor 17 may be supported by a bracket 18 rigid with end support 11. This motor has an output shaft 19 that rigidly carries spur gear 20 that meshes with a shaft driving gear 21 rigidly carried by shaft 16, all as a means for driving shaft 16 by the motor.

It is to be understood, that instead of employing two die cutters, I may merely employ one. However, by employing two, I increase the output of the operation by one hundred percent. The two die cutters 2 and 3 are identical and each include a vacuum head element 22, a masking plate 23 internally braced by ribs 24, and a supporting screen 25 bounded by a knife 26 whose periphery conforms to the predetermined die shape necessary to form the desired blank to be cut out of the sheet 4. As a mere example of the utility of my device, it may be used to cut floor mats of desired contours out of sheet 4 which may be considered as mat stock.

To support the platen 1, I may employ a support 27 secured to the base 9. This support 27 has rigidly secured thereto fluid cylinders 28 in each of which is slidably mounted a piston 29, which may be operated either hydraulically or pneumatically. Each of the pistons 29 is pivotally connected at 30 to a lug 31 on the platen 1 at approximately midway of the height of the platen. The two lower corners of the platen are provided with forks 32 to receive lugs 33 on support 27. Lugs 33 have elongated slots 34 to slidably receive cross pins 35 that extend through the two prongs of fork 32 and lugs 33 to form a sliding pivotal support for the platen for power movement of the latter into the vertical cutting operation of Fig. 3 and movement in a clockwise position away from the vertical cutting operation position to enable the stock to be moved into position for the next cutting operation. A compressed air line, or hydraulic line, is generally indicated at 36 leading from a suitable power source to the cylinders 28 behind pistons 29. If desired, the pistons 29 may be normally spring urged to the right so as to return the platen clockwise about pivot pins 35 upon shutting off the power line 36 and so that the platen will be out of the way of the advancing mat stock.

Connected to each of the two die cutters 2 and 3 is a vacuum line 37 and a fluid power line 38, such, for example, as an air blast line, leading into the vacuum head element 22. The purpose of this arrangement is to hold the mat stock 4 by vacuum in its position indicated in dotted lines in Fig. 3 during the time of the forward power stroke of the piston and platen 1. This power stroke presses the mat stock into engagement with the knife 26 to cut out a blank of mat stock conforming with the contour of the knife 26.

As shown in Figs. 1, 2 and 3, die cutter 2 is in the vertical position in alignment with platen 1 and the mat stock 4 is in position therebetween for the cutting operation. However, die cutter 3 is shown in Figs. 1 and 2 as being horizontal and also longitudinally removed from the platen with respect to shaft 16 and vertically above platform 8. As stated before, this platform, or pallet, supports the stack 6 of the blanks. Having been held by vacuum in element 22 as the die cutter 3 has been moved from the vertical cutting position, shown to be occupied by die cutter 2 in Figs 1 and 2, the vacuum line 37 must now be shut off and the fluid power line 38 turned on to release and expel the blank from the die cutter horizontally onto the stack 6 on pallet 8.

As an example of a means for simultaneously and alternately operating these two die cutters back and forth into these cutting and stacking positions, I may form two spaced sections of the shaft into identical diamond shaped threaded timing screws 39 and 40. Engaging the screw 39 is a pawl, not shown, carried by a pawl housing, or carrier 41, and similarly a pawl in carrier 42 engages screw 40. Carrier 41 is rigid with die cutter 2 and carrier 42 is rigid with die cutter 3. Also rigid with die cutter 2 is a bracket 43 that carries a roller 44 and rigid with die cutter 3 is a bracket 45 that carries a roller 46. If a double unit is used as shown in the drawings, and it is desired to operate only one die cutter, the timing screw engaging pawl of the carrier for the other cutter head may be removed.

It will be understood that, by reference to Figs. 1 and 2, a further rotation of shaft 16 will simultaneously cause carriers 41 and 42 to move linearly to the left ends of screws 39 and 40, respectively, and that a continued rotation of the shaft in the same direction will also linearly move carriers 41 and 42 simultaneously to the right-hand extremity of screws 39 and 40. This back and forth movement continues as the shaft 16 is rotated in the same direction. When the carriers 41 and 42 move either to the extreme right or extreme left so that the die cutters 2 and 3 are respectively in cutting and stacking position a momentary pause is effected when the pawl reaches the end thereof and slips into position to reverse the linear movement of the carriers as the cutting and stacking operations take place.

This being true, I have also provided means for accomplishing alternate movement of the two die cutters into vertical cutting and horizontal stacking positions. This may comprise a track generally indicated at 47 and whose contour is shown in detail in Figs. 5 and 6. The track 47 is simultaneously engaged by rollers 44 and 46. As shown in top elevation in Figs. 2 and 5, the track is continuous and has members shown to be spaced horizontally at its center section 48 and members shown to merge at its two end sections 49 and 50, whereas in side or front elevation, in Figs. 1 and 6, the spaced members appear to merge at the center section 48 and are shown to be spaced vertically at the two end sections 49 and 50. This track, which I refer to as a tilt and guide track, may be supported by a bracket 52.

As shaft 16 is rotated, carrier 42 is moved linearly to the left. The carrier 42 is also capable of pivoting about the shaft, and its timing screw 40. Both the carriers 42 and bracket 45 and its roller 46 are rigid with the die cutter 3. In its horizontal position of Fig. 1, the cut blank of mat stock has just been expelled onto the stack 6. The roller 46 is in engagement with end section 50 of the tilt track. However, the curvature of the tilt track is such that by the time roller 46 comes in engagement with center section 48 of the track, the die cutter 3 has assumed the vertical position of die cutter 2, as shown in Fig. 1. Likewise, and simultaneously, roller 44 of the die cutter 2 has moved in the tilt track from center section 48 to the other end section 49 to move die cutter linearly to the left and tilt it into a horizontal position over pallet 7 to deposit its blank on the stack 5 in the same manner as described and shown in connection with die cutter 3 in Fig. 1. If desired, the two pallets 7 and 8 may be supported hydraulically or otherwise by lifts 51 to be automatically lowered as the mat blank stacks 5 and 6 increase in height in the operation of my machine. For convenience, a pit 53 is formed in the base 9 to receive the waste mat stock remaining in the sheet material after the blank has been cut out of the sheet.

Thus it will be seen that I have provided an efficient fully automatic power operated machine in which no conveyor belts are employed. Instead, I employ a pivotal rigid platen and a die cutter head, between which I vertically feed a sheet of mat stock. I provide means for guiding the cutter head into vertical position and fluid power means for pressing the platen and the mat stock against the cutter head to effect the cutting of the desired blank. In the cutter head I employ vacuum means for holding the sheet in position for cutting and subsequent travel. I employ a motor driven means for imparting linear travel of the cutter head toward and away from vertical cutting operation position and guiding and tilting means for disposing the cutter head horizontally above a vertically movable pallet. I provide the cutter head also with a power fluid blank expelling means, as the vacuum means is shut off, for positively expelling and stacking the blanks horizontally upon the pallet. The machine, aside from the electric motor drive, is shown to be pneumatic, and necessitates only valve control of the fluid lines and eliminates manual handling of the sheets or blanks and assures one-hundred percent trim in the blank cutting operations.

It will be understood that in using the words "linear" in the specification and claims, as for example in the phrase "linear movement of the die cutter head," I mean a lateral or sidewise movement of the head as it is moved by means of its carrier alternately back and forth from vertical cutting position to horizontal stacking position as illustrated by the respective positions shown in Figs. 1 and 2.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In an apparatus for cutting blanks of predetermined size and contour out of sheet material, a die cutter head including a blank cutting knife, a rigid backing member, said sheet material being adapted to be vertically disposed between said head and said backing member when they are in cutting operation position, means for moving said backing member toward said head for cutting said blanks from said sheet material, and means for moving said cutter head alternately back and forth from vertical cutting position to a horizontal stacking position laterally apart from said backing member.

2. In an apparatus for cutting blanks of predetermined size and contour out of sheet material, a die cutter head including a blank cutting knife, a rigid backing member, said sheet material being adapted to be vertically disposed between said head and said backing member when they are in cutting operation position, means for holding said sheet during the cutting operation and for holding said cut-out blank after cutting operation, means for moving said backing member toward said head on the opposite side of said sheet for cutting said blanks, and means for imparting lateral and tilting movement to said cutter head alternately back and forth from cutting position to a predetermined point of travel laterally spaced from said backing member.

3. In an apparatus for cutting blanks of predetermined size and contour out of sheet material, a platen and means for moving said platen into vertical cutting operation position, a die cutter head including a blank cutting knife, means for imparting linear movement to said cutter head alternately back and forth from said cutting position to a predetermined point of travel, said cutter head being pivotally mounted on said means for imparting linear movement thereto, guiding and tilting means for said cutter head for alternately, linearly moving and tilting said cutter head into vertical cutting operation position and to horizontal blank unloading and stacking position in the combined linear movements of said cutter head and the guided movement thereof, means for feeding said sheet material vertically into position between said platen and cutting head, means in said cutter head for holding said sheet in vertical position for power operation of said platen against the opposite side of said sheet against the blade of said cutter head and for holding the resulting cut-out blank while the die cutter head moves linearly.

4. In an apparatus for cutting blanks of predetermined size and contour out of sheet material, a pivotally mounted platen and a power operated means for pivoting said platen into vertical cutting operation position, a pair of die cutter heads each including a blank cutting knife, means for imparting linear movement to said cutter heads alternately back and forth toward and away from said platen, said cutter heads being pivotally mounted on said means for imparting linear movement thereto, guiding and tilting means for said cutter heads for alternately linearly moving and tilting said cutter heads into central vertical cutting operation position and to horizontal blank unloading and stacking position in the combined linear movements of said cutter heads and the guided pivotal movement thereof, means for feeding said sheet material vertically into position between said platen and cutting head, means in each of said cutter heads for holding said sheet in vertical position for power operation of said platen against the opposite side of said sheet against the blades of said cutter heads and for holding and moving the resulting cut-out blank longitudinally away from said platen.

5. In an apparatus for cutting blanks of predetermined size and contour out of sheet material, a pivotally mounted platen and a power fluid operated means for pivoting said platen into vertical cutting operation position, a die cutter head including a blank cutting knife, means for imparting linear movement to said cutter head alternately back and forth toward and away from said platen, said cutter head being pivotally mounted on said means for imparting linear movement thereto, guiding and tilting means for said cutter head alternately linearly moving and tilting said cutter head into central vertical cutting operation position and to horizontal blank unloading and stacking position in the combined linear movements of said cutter head and the guided pivotal movement thereof, means for feeding said sheet material vertically into position between said platen and cutting head, vacuum means in said cutter head for holding said sheet in vertical position for power operation of said platen against the opposite side of said sheet against the blade of said cutter head and for holding and moving the resulting cut-out blank longitudinally away from said platen and power means for expelling said cut-out blanks from said cutter head and stacking them horizontally.

6. In an apparatus for cutting blanks of predetermined size and contour out of sheet material, a pivotally mounted platen and a power fluid operated means for pivoting said platen into vertical cutting operation position, a pair of die cutter heads each including a blank cutting knife, means for imparting linear movement to said cutter heads alternately back and forth toward and away from said platen, said cutter heads being pivotally mounted on said means for imparting linear movement thereto, guiding and tilting means for said cutter heads for alternately linearly moving and tilting said cutter heads into central vertical cutting operation position and to horizontal blank unloading and stacking position in the combined linear movements of said cutter heads and the guided pivotal movement thereof, means for feeding said sheet material vertically into position between said platen and cutting head, vacuum means in said cutter head for holding said sheet in vertical position for power operation of said platen against the opposite side of said sheet against the blade of said cutter head and for holding and moving the resulting cut-out blank longitudinally away from said platen and power means for expelling said cut-out blanks from said cutter heads and stacking them horizontally.

7. In an apparatus for cutting blanks of predetermined size and contour out of sheet material, a pivotally mounted platen and a power operated means for pivoting said platen into vertical cutting operation position, a die cutter head having a carrier and a blank cutting knife, means for imparting linear movement to said carrier alternately back and forth toward and away from said platen, said carrier being pivotally mounted on said means for imparting linear movement thereto, a roller carried by said cutter head, an endless track engaged by said roller, said endless track comprising members whose center section includes members that are horizontally spaced and twisted uniformly toward a longitudinal end into a member that is vertically spaced, by means of which said cutter head is adapted to be alternately linearly moved into central vertical cutting operation position and to horizontal blank unloading and stacking position in the combined linear movements of said carrier and the guided pivotal movement of said carrier and cutting head by said track, means for feeding said sheet material vertically into position between said platen and cutting head, means in said cutter head for holding said sheet in vertical position for power operation of said platen against the opposite side of said sheet against the blade of said cutter head and for holding and removing the resulting cut-out blank longitudinally away from said platen and means for expelling said cut-out blanks from said cutter heads and stacking them horizontally.

8. In an apparatus for cutting blanks of predetermined size and contour out of sheet material, a pivotally mounted platen and a power operated means for pivoting said platen into vertical cutting operation position, a pair of die cutter heads each having a carrier and a blank cutting knife, means for imparting linear movement to said carriers alternately back and forth toward and away from said platen, said carriers being pivotally mounted on said means for imparting linear movement thereto, a roller carried by each of said cutter heads, an endless track engaged by said rollers, said endless track comprising members whose center section includes members that are horizontally spaced and contoured uniformly toward each longitudinal end into members that are vertically spaced, by means of which said cutter heads are adapted to be alternately linearly moved into central vertical cutting operation position and to horizontal blank unloading and stacking position in the combined linear movements of said carriers on said timing screws and the guided pivotal movement of said carriers and cutting heads by said track, means for feeding said sheet material vertically into position between said piston and cutting head, means in said cutter head for holding said sheet in vertical position for power operation of said platen against the opposite side of said sheet against the blade of said cutter head and for holding and moving the resulting cut-out blank longitudinally away from said platen and means for expelling said cut-out blanks from said cutter heads and stacking them horizontally.

9. In an apparatus for cutting blanks of predetermined size and contour out of sheet material, a pivotally mounted platen and a power operated means for pivoting said platen into vertical cutting operation position, a die cutter head including a blank cutting knife, said head having a carrier, an electric motor and a motor driven rotary shaft, spaced journal supports for said shaft, said shaft having a portion provided with a timing screw engaged by said carrier for imparting linear movement to said carrier alternately back and forth to the two extremities of said timing screw, said carrier being pivotally mounted on said timing screw, a bracket, and roller carried by said cutter head, a track engaged by said roller, said track comprising members whose center section includes members that are horizontally spaced and twisted uniformly toward a longitudinal end into members that are vertically spaced, by means of which said cutter head upon rotation of said shaft, is adapted to be alternately linearly moved along the timing screw of said shaft into central vertical cutting operation position and to horizontal blank unloading and stacking position in the combined linear movements of said carrier on said timing screw and the guided pivotal movement of said carrier and cutting head by said track, means for feeding said sheet material vertically into position between said platen and cutting head, means in said cutter head for holding said sheet in vertical position for power operation of said platen against the opposite side of said sheet against the blade of said cutter head and for holding the resulting cut-out blank longitudinally away from said platen and means for expelling said cut-out blanks from said cutter head and stacking them horizontally.

10. In an apparatus for cutting blanks of predetermined size and contour out of sheet material, a pivotally mounted platen and a power operated means for pivoting said platen into vertical cutting operation position, a pair of die cutter heads each including a blank cutting knife, said head having a carrier, an electric motor and a motor driven rotary shaft, spaced journal supports for said shaft, said shaft having two longitudinally spaced portions provided with timing screws engaged by said carriers for imparting linear movement to said carriers alternately back and forth to the two extremities of said timing screws, said carriers being pivotally mounted on said timing screws, a bracket and roller carried by each of said cutter heads, an endless track engaged by said rollers, said endless track comprising members whose center section includes members that are horizontally spaced and twisted uniformly toward each longitudinal end into members that are vertically spaced, by means of which said cutter heads, upon rotation of said shaft, are adapted to be alternately linearly moved along the timing screws of said shaft into central vertical cutting operation position and to horizontal blank unloading and stacking position in the combined linear movements of said carriers on said timing screws and the guided pivotal movement of said carriers and cutting heads by said track, means for feeding said sheet material vertically into position between said platen and cutting head, means in said cutter head for holding said sheet in vertical position for power operation of said platen against the opposite side of said sheet against the blade of said cutter head and for holding the resulting cut out blank longitudinally away from said platen and toward the respective end of said track, a means for expelling said cut out blanks from said cutter heads and stacking them horizontally.

11. In an apparatus for cutting blanks of predetermined size and contour out of sheet material, a pivotally mounted platen and a power fluid operated means for pivoting said platen into vertical cutting operation position, a die cutter head including a blank cutting knife, said head having a carrier, an electric motor and a motor driven rotary shaft, spaced journal supports for said shaft, said shaft having a portion provided with a timing screw engaged by said carrier for imparting linear movement to said carrier alternately back and forth to the two extremities of said timing screw, said carrier being pivotally mounted on said timing screw, a bracket and roller carried by said cutter head, a track engaged by said roller, said track comprising members whose center section includes members that are horizontally spaced and twisted uniformly toward a longitudinal end into members that are vertically spaced, by means of which said cutter head, upon rotation of said shaft, is adapted to be alternately linearly moved along the timing screw of said shaft into central vertical cutting operation position and to horizontal blank unloading and stacking position in the combined linear movements of said carrier on said timing screw and the guided pivotal movement of said carrier and cutting head by said track, power feed roll means for feeding said sheet material vertically into position between said platen and cutting head, vacuum means in said cutter head for holding said sheet in vertical position for power operation of said platen against the opposite side of said sheet against the blade of said cutter head and for holding and moving the resulting cut out blank longitudinally toward the respective end of said track, a vertically movable pallet near each end of said track and power means for expelling said cut out blanks from said cutter heads and stacking them horizontally on said pallet.

12. In an apparatus for cutting blanks of predetermined size and contour out of sheet material, a pivotally mounted platen and a power fluid operated means for pivoting said platen into vertical cutting operation position, a die cutter head including a blank cutting knife, said head having a carrier, an electric motor and a motor driven rotary shaft, spaced journal supports for said shaft, said shaft having two longitudinally spaced portions provided with timing screws engaged by said carriers for imparting linear movement to said carriers alternately back and forth to the two extremities of said timing screws, said carriers being pivotally mounted on said timing screws, a bracket and roller carried by each of said cutter heads, an endless track engaged by said rollers, said endless track comprising members whose center section includes members that are horizontally spaced and twisted uniformly toward each longitudinal end into members that are vertically spaced, by means of which said cutter heads, upon rotation of said shaft, are adapted to be alternately linearly moved along the timing screws of said shaft into central vertical cutting operation position and to horizontal blank unloading and stacking position in the combined linear movements of said carriers on said timing screws and the guided pivotal movement of said carriers and cutting heads by said track, power feed roll means for feeding said sheet material vertically into position between said platen and cutting head, vacuum means in said cutter head for holding said sheet in vertical position for power operation of said platen against the opposite side of said sheet against the blade of said cutter head and for holding the resulting cut out blank longitudinally toward the respective end of said track, a vertically movable pallet near each end of said track and power means for expelling said cut out blanks from said cutter heads and stacking them horizontally on said pallets.

References Cited in the file of this patent

UNITED STATES PATENTS

| 729,454 | Tyberg | May 26, 1903 |
| 964,601 | Schwaber | July 12, 1910 |
| 1,443,761 | Schoendelen | Jan. 30, 1923 |
| 1,819,481 | Pearson | Aug. 18, 1931 |
| 1,978,051 | MacDonald | Oct. 23, 1934 |
| 2,253,636 | Matha | Aug. 26, 1941 |

FOREIGN PATENTS

| 17,446 | Great Britain | July 30, 1907 |
| 757,921 | France | Oct. 23, 1933 |